(12) United States Patent
Sim (10) Patent No.: US 11,873,362 B2
(45) Date of Patent: Jan. 16, 2024

(54) RADIATION CURABLE POLYMER COMPOSITION FOR 3D PRINTER

(71) Applicant: GRAPHY INC., Seoul (KR)

(72) Inventor: Un Seob Sim, Seoul (KR)

(73) Assignee: GRAPHY INC., Seoul (KR)

(*) Notice: Subject to any disclaimer, the term of this patent is extended or adjusted under 35 U.S.C. 154(b) by 503 days.

(21) Appl. No.: 17/053,062

(22) PCT Filed: Jun. 14, 2019

(86) PCT No.: PCT/KR2019/007232
§ 371 (c)(1),
(2) Date: Nov. 4, 2020

(87) PCT Pub. No.: WO2020/040414
PCT Pub. Date: Feb. 27, 2020

(65) Prior Publication Data
US 2021/0189045 A1 Jun. 24, 2021

(30) Foreign Application Priority Data

Aug. 24, 2018 (KR) ........................ 10-2018-0099277

(51) Int. Cl.
| | | |
|---|---|---|
| C08F 2/46 | (2006.01) | |
| C08F 2/50 | (2006.01) | |
| C08G 61/04 | (2006.01) | |
| C08F 290/14 | (2006.01) | |
| C08K 5/5419 | (2006.01) | |

(52) U.S. Cl.
CPC ........ C08F 290/147 (2013.01); C08K 5/5419 (2013.01)

(58) Field of Classification Search
CPC .... C08F 290/147; C08F 290/067; C08F 2/50; C08F 230/08; C08L 51/08; C08L 75/16; B33Y 70/00; C08K 5/5419

USPC .......... 522/59, 49, 6, 71, 1, 189, 184; 520/1
See application file for complete search history.

(56) References Cited

FOREIGN PATENT DOCUMENTS

| | | | |
|---|---|---|---|
| CN | 104334662 | A | 2/2015 |
| CN | 107868443 | A | 4/2018 |
| EP | 2436510 | A1 | 4/2012 |
| JP | 2014065787 | A | 4/2014 |
| JP | 2018083901 | * | 5/2018 |
| JP | 2018083901 | A | 5/2018 |
| KR | 20010080997 | A | 8/2001 |
| KR | 20160018583 | A | 2/2016 |
| KR | 20170010299 | A | 1/2017 |
| KR | 101831819 | B1 | 2/2018 |
| WO | WO2016059340 | A1 | 4/2016 |

OTHER PUBLICATIONS

Oga et al., JP 2018-083901 Machine Translation, May 31, 2018 (Year: 2018).*
The extended European search report of EP 19 85 1356, dated Dec. 10, 2021.
International Search Report of PCT/KR2019/007232, dated Sep. 19, 2019, English translation.

* cited by examiner

Primary Examiner — Jessica Whiteley
(74) Attorney, Agent, or Firm — STIP Law Group, LLC (57) ABSTRACT

The present disclosure relates to a photocurable polymer composition for 3D printing including: a UV-curable polyurethane oligomer; a photoinitiator; an oligomer; and a stabilizer. The photocurable polymer composition for 3D printing can produce a 3D printed product having excellent physical properties such as thermal properties, strength, elastic modulus and tensile elongation. In addition, the photocurable polymer composition can produce a 3D printed product which, even when the original shape thereof is deformed during use, can be restored to the original shape thereof.

5 Claims, 2 Drawing Sheets

RADIATION CURABLE POLYMER COMPOSITION FOR 3D PRINTER

Cross-reference to Related Applications

This application is the U.S. National Phase under 35 U.S.C. § 371 of International Application No. PCT/KR2019/007232 filed on Jun. 14, 2019, which in turn claims the benefit of Korean Application No. 10-2018-0099277, filed on Aug. 24, 2018, the disclosures of which are incorporated by reference into the present application.

TECHNICAL FIELD

The present disclosure relates to a photocurable polymer composition for 3D printing, and more particularly, to a photocurable polymer composition for 3D printing, which is applicable to 3D printing and can produce a 3D printed product, which has excellent physical properties such as thermal properties, strength, elastic modulus and tensile elongation and can be restored to the original shape thereof, by 3D printing using the same.

BACKGROUND ART

A 3D printer has a 3D printing mechanism that is configured to form a physical object in three dimensions. There have been continued studies on a resin composition for 3D printing as a 3D printing ink that enables such a 3D printer to form a physical object in three dimensions.

The advantages of 3D printing are that it requires a relatively low production cost even when only one product is produced, and that it can freely produce a product having any shape. In conventional model production technology, the production cost for a product is very high, because a mold is made and then the product is produced using the mold. However, the 3D printing technology produces a product by depositing a raw material layer-by-layer without using a mold, and thus is very suitable for small quantity batch production.

In addition, the 3D printing technology can simply produce even a product having a very complex shape, and thus the types of products that can be produced using the 3D printing technology can be considered infinite. Accordingly, it is expected that the 3D printing technology will change the paradigm of technology in various fields, such as manufacturing, medical and IT fields, and lead to industrial innovation.

A material for 3D printing should have an appropriate melting point and flowability to ensure smooth flow in the nozzle part of a FDM type 3D printer, and should have a high solidification rate to prevent deformation of the printed product after extrusion from the nozzle part. Among thermoplastic resins, filament materials, which satisfy the above properties and are most commonly used at present, are mainly represented by poly(lactic acid) and acrylonitrile butadiene styrene (ABS), and polyetherimide (PEI), polycarbonate (PC) and the like are used as highly heat-resistant and highly functional materials. However, these materials have a limitation in that the physical properties thereof are significantly different from those of materials made by injection molding. In addition, there is no method capable of particularly further increasing strength after printing.

Poly(lactic acid), a universal material for 3D printing, is an environmentally friendly resin made of a material extracted from corn starch. Even when hot food is placed in a container made of poly(lactic acid) or a child bites or sucks the container, not only environmental hormones but also toxic substances such as heavy metals are not detected. Thus, poly(lactic acid) is safe for use in real life.

In addition, poly(lactic acid) is a biodegradable polymer which has the same characteristics as common plastics during use, but has the advantage of being completely biodegraded by microorganisms after disposal. Due to such biodegradation properties that are harmless to the human body and the environment, poly(lactic acid) has recently received attention in relation to plastic waste problems.

However, poly(lactic acid) having the above-described advantages has low impact resistance due to high brittleness, and has low flexibility. Thus, poly(lactic acid) has limitations in its application to industrial 3D printed products such as toys, which require soft touch or impact resistance. Therefore, the development of new materials is continuously required. Manufacturing of precision parts and highly functional parts by FDM type 3D printing may be difficult due to technical limitations. Accordingly, there is a need for the invention of a polymer material as a photocurable resin, which is widely used in industrial 3D printers due to good output quality and fast production speed, among 3D printing materials.

3D printing technology has recently been utilized in various medical fields, and is very efficient in terms of production time, production cost and process, compared to conventional machining technology. However, as mentioned above, when a conventional 3D printing material such as poly(lactic acid) is used, a problem arises in that the material is difficult to apply to the medical field, due to limitations in the physical properties of a printed product. Therefore, there is an urgent need to develop a photocurable polymer material for 3D printing that is applicable to various medical fields.

PRIOR ART DOCUMENTS

Patent Documents (Patent Document 1) KR 10-1831819 B1

DISCLOSURE

Technical Problem

An object of the present disclosure is to provide a photocurable polymer composition for 3D printing.

Another object of the present disclosure is to a photocurable polymer composition for 3D printing, which may produce a 3D printed product having excellent physical properties such as thermal properties, strength, elastic modulus and tensile elongation.

Still another object of the present disclosure is to provide a photocurable polymer composition for 3D printing, which may produce a 3D printed product, which, even when the original shape thereof is deformed during use, can be restored to the original shape thereof.

Technical Solution

To achieve the above objects, a photocurable polymer composition for 3D printing according to one embodiment of the present disclosure may include: a UV-curable polyurethane oligomer represented by the following Formula 1; a photoinitiator; a silane coupling agent; an oligomer; and a stabilizer:

[Formula 1]

[Formula 2]

wherein

A is a substituent represented by Formula 2 above, wherein * represents a moiety that is linked;

$R_1$ to $R_8$ are the same or different and are each independently a substituted or unsubstituted alkylene group having 1 to 200 carbon atoms, a substituted or unsubstituted arylene group having 6 to 200 carbon atoms, a substituted or unsubstituted heteroarylene group having 5 to 200 nuclear atoms, or a substituted or unsubstituted cycloalkylene group having 3 to 200 carbon atoms; and the substituted alkylene group, the substituted arylene group, the substituted heteroarylene group and the substituted cycloalkylene group are substituted with one or more substituents selected from the group consisting of hydrogen, deuterium, a cyano group, a nitro group, a halogen group, a hydroxyl group, an alkyl group having 1 to 30 carbon atoms, a cycloalkyl group having 1 to 20 carbon atoms, an alkenyl group having 2 to 30 carbon atoms, an alkynyl group having 2 to 24 carbon atoms, an aralkyl group having 7 to 30 carbon atoms, an aryl group having 6 to 30 carbon atoms, a heteroaryl group having 5 to 60 nuclear atoms, a heteroarylalkyl group having 6 to 30 carbon atoms, an alkoxy group having 1 to 30 carbon atoms, an alkylamino group having 1 to 30 carbon atoms, an arylamino group having 6 to 30 carbon atoms, an aralkylamino group having 6 to 30 carbon atoms, a heteroarylamino group having 2 to 24 carbon atoms, an alkylsilyl group having 1 to 30 carbon atoms, an arylsilyl group having 6 to 30 carbon atoms, and an aryloxy group having 6 to 30 carbon atoms, and when they are substituted with a plurality of sub stituents, these sub stituents are the same or different.

The UV-curable polyurethane oligomer has a weight-average molecular weight of 10,000 to 1,000,000.

The photoinitiator is a compound represented by the following Formula 4:

the substituted alkyl group and the substituted cycloalkyl group are substituted with one or more sub stituents selected from the group consisting of hydrogen, deuterium, a cyano group, a nitro group, a halogen group, a hydroxyl group, an alkyl group having 1 to 30 carbon atoms, a cycloalkyl group having 1 to 20 carbon atoms, an alkenyl group having 2 to 30 carbon atoms, an alkynyl group having 2 to 24 carbon atoms, an aralkyl group having 7 to 30 carbon atoms, an aryl group having 6 to 30 carbon atoms, a heteroaryl group having 5 to 60 nuclear atoms, a heteroarylalkyl group having 6 to 30 carbon atoms, an alkoxy group having 1 to 30 carbon atoms, an alkylamino group having 1 to 30 carbon atoms, an arylamino group having 6 to 30 carbon atoms, an aralkylamino group having 6 to 30 carbon atoms, a heteroarylamino group having 2 to 24 carbon atoms, an alkylsilyl group having 1 to 30 carbon atoms, an arylsilyl group having 6 to 30 carbon atoms, and an aryloxy group having 6 to 30 carbon atoms, and when they are substituted with a plurality of sub stituents, these sub stituents are the same or different.

The oligomer may be selected from the group consisting of an epoxy acrylate oligomer, $H_{12}$ Dian-bis-glycidyl ether (4,4'-(1-methylethylidene)biscyclohexanol polymer with (chloromethyl)oxirane), and a mixture thereof The stabilizer may be selected from the group consisting of 2,6-di-tert-butyl-p-cresol, diethylethanolamine, trihexylamine, a hindered amine, an organic phosphate, a hindered phenol, and mixtures thereof.

The polymer composition for 3D printing includes the UV-curable polyurethane oligomer, and may include, based on 100 parts by weight of the UV-curable polyurethane oligomer, 1.5 to 15 parts by weight of the photoinitiator, 0.1 to 1.5 parts by weight of the silane coupling agent, 15 to 45 parts by weight of the oligomer, and 0.1 to 2 parts by weight of the stabilizer.

[Formula 4]

wherein $X_1$ is S, O or $N(R_{11})$;

$R_9$ to $R_{11}$ are the same or different and are each independently hydrogen, deuterium, a cyano group, a nitro group, a halogen group, a hydroxyl group, a substituted or unsubstituted alkyl group having 1 to 30 carbon atoms, or a substituted or unsubstituted cycloalkyl group having 3 to 30 carbon atoms; and

Hereinafter, the present disclosure will be described in more detail.

3D printing in the present disclosure refers to a process of producing a three-dimensional object by depositing a material using 3D digital data. In the present specification, description is made focusing on digital light processing (DLP) technology, Stereolithography apparatus (SLA) technology and PolyJet technology as 3D printing technologies, but it may be understood that the present disclosure may also be applied to other 3D printing technologies.

The photocurable polymer of the present disclosure is a material that is cured by light irradiation, and refers to a polymer that is crosslinked and polymerized into a polymer network. In the present specification, description is made focusing on UV light, but the present disclosure is not limited to UV light and may also be applied to other light.

The photocurable polymer composition for 3D printing according to one embodiment of the present disclosure may include: a UV-curable polyurethane oligomer represented by the following Formula 1; a photoinitiator; a silane coupling agent; an oligomer; and a stabilizer:

[Formula 1]

[Formula 2]

wherein

A is a substituent represented by Formula 2 above, wherein * represents a moiety that is linked;

$R_1$ to $R_8$ are the same or different and are each independently a substituted or unsubstituted alkylene group having 1 to 200 carbon atoms, a substituted or unsubstituted arylene group having 6 to 200 carbon atoms, a substituted or unsubstituted heteroarylene group having 5 to 200 nuclear atoms, or a substituted or unsubstituted cycloalkylene group having 3 to 200 carbon atoms; and the substituted alkylene group, the substituted arylene group, the substituted heteroarylene group and the substituted cycloalkylene group are substituted with one or more substituents selected from the group consisting of hydrogen, deuterium, a cyano group, a nitro group, a halogen group, a hydroxyl group, an alkyl group having 1 to 30 carbon atoms, a cycloalkyl group having 1 to 20 carbon atoms, an alkenyl group having 2 to 30 carbon atoms, an alkynyl group having 2 to 24 carbon atoms, an aralkyl group having 7 to 30 carbon atoms, an aryl group having 6 to 30 carbon atoms, a heteroaryl group having 5 to 60 nuclear atoms, a heteroarylalkyl group having 6 to 30 carbon atoms, an alkoxy group having 1 to 30 carbon atoms, an alkylamino group having 1 to 30 carbon atoms, an arylamino group having 6 to 30 carbon atoms, an aralkylamino group having 6 to 30 carbon atoms, a heteroarylamino group having 2 to 24 carbon atoms, an alkylsilyl group having 1 to 30 carbon atoms, an arylsilyl group having 6 to 30 carbon atoms, and an aryloxy group having 6 to 30 carbon atoms, and when they are substituted with a plurality of sub stituents, these sub stituents are the same or different.

The UV-curable polyurethane oligomer is a polymer having a weight-average molecular weight of 10,000 to 1,000,000.

More preferably, the UV-curable polyurethane oligomer is a compound represented by the following Formula 3:

[Formula 3]

wherein n and m are the same or different and are each independently an integer ranging from 1 to 200, and A is as defined in Formula 1 above.

More specifically, the UV-curable polyurethane oligomer is a polymer compound having a photocurable functional group for UV curing linked to a polyurethane oligomer, and the photocurable functional group is the substituent represented by Formula 2 above.

The substituent represented by Formula 2 contains a carbon-carbon double bond therein, and may exhibit photocuring activity by the carbon-carbon double bond.

In addition, the UV-curable polyurethane oligomer includes a polyurethane structure as a main chain, and the photocurable functional group is linked to the polyurethane structure. Linkage between the polyurethane structure and the photocurable functional group is achieved using a linker including a soft functional group attached to a urethane linker and a linker including a hard functional group attached to a urethane linker.

The linker including a soft functional group attached to a urethane linker makes it possible to use the flexible property of the soft functional group, and the hard functional group may exhibit heat resistance.

That is, as the photocurable functional group is linked to the UV-curable polyurethane oligomer and the linker includes the soft functional group and the hard functional group, the UV-curable polyurethane oligomer may exhibit a flexible effect using a carbon skeleton having soft properties at room temperature, and may also exhibit strong heat resistance using a carbon skeleton having hard properties at room temperature.

As the UV-curable polyurethane oligomer includes the carbon skeleton having hard properties, it is possible to produce a 3D printed product having excellent physical properties such as thermal properties, strength, elastic modulus and tensile elongation.

In addition, as the UV-curable polyurethane oligomer includes the carbon skeleton having soft properties, it is possible to produce a 3D printed product which, even when the original shape thereof is deformed during use, may be restored to the original shape thereof.

In general, a composition for 3D printing may include only a carbon skeleton having hard properties in order to improve the physical properties of a 3D printed product. However, in this case, a problem arises in that, when the shape of the 3D printed product is deformed during use, the 3D printed product cannot be restored to the original shape, and thus cannot be used multiple times.

In addition, when a composition for 3D printing includes only a carbon skeleton having soft properties, a problem arises in that the 3D printed product has low physical properties, and thus cannot exhibit thermal properties, strength, elastic modulus, and tensile elongation sufficient for use as a printed product.

As the composition for 3D printing according to the present disclosure includes a carbon skeleton having hard properties and a carbon skeleton having soft properties in the UV-curable polyurethane oligomer, the 3D printed product produced from the composition may exhibit excellent physical properties such as thermal properties, strength, elastic modulus and tensile elongation, and may also use the flexible property of the soft functional group, and thus when the shape thereof is deformed during use, the printed product may be restored to the original shape thereof and reused.

The photoinitiator is a compound represented by the following Formula 4:

[Formula 4]

wherein
$X_1$ is S, O or $N(R_{11})$;
$R_9$ to $R_{11}$ are the same or different and are each independently hydrogen, deuterium, a cyano group, a nitro group, a halogen group, a hydroxyl group, a substituted or unsubstituted alkyl group having 1 to 30 carbon atoms, or a substituted or unsubstituted cycloalkyl group having 3 to 30 carbon atoms; and
the substituted alkyl group and the substituted cycloalkyl group are substituted with one or more sub stituents selected from the group consisting of hydrogen, deuterium, a cyano group, a nitro group, a halogen group, a hydroxyl group, an alkyl group having 1 to 30 carbon atoms, a cycloalkyl group having 1 to 20 carbon atoms, an alkenyl group having 2 to 30 carbon atoms, an alkynyl group having 2 to 24 carbon atoms, an aralkyl group having 7 to 30 carbon atoms, an aryl group having 6 to 30 carbon atoms, a heteroaryl group having 5 to 60 nuclear atoms, a heteroarylalkyl group having 6 to 30 carbon atoms, an alkoxy group having 1 to 30 carbon atoms, an alkylamino group having 1 to 30 carbon atoms, an arylamino group having 6 to 30 carbon atoms, an aralkylamino group having 6 to 30 carbon atoms, a heteroarylamino group having 2 to 24 carbon atoms, an alkylsilyl group having 1 to 30 carbon atoms, an arylsilyl group having 6 to 30 carbon atoms, and an aryloxy group having 6 to 30 carbon atoms, and when they are substituted with a plurality of sub stituents, these sub stituents are the same or different.

More preferably, the photoinitiator is a compound represented by the following Formula 5:

[Formula 5]

The oligomer may be selected from the group consisting of an epoxy acrylate oligomer, $H_{12}$ Dian-bis-glycidyl ether (4,4'-(1-methylethylidene)biscyclohexanol polymer with (chloromethyl)oxirane), and a mixture thereof More specifically, the epoxy acrylate oligomer may be one or more compound selected from the group consisting of a phenyl epoxy (meth)acrylate oligomer, a bisphenol A epoxy di(meth)acrylate oligomer, an aliphatic alkyl epoxy di(meth)acrylate oligomer, and an aliphatic alkyl epoxy tri(meth)acrylate oligomer. The oligomer may reduce swelling caused by an organic solvent, and may also improve surface hardness, abrasion resistance, heat resistance, and the like.

More specifically, the silane coupling agent is 3-methacryloxypropyltrimethoxysilane, but is not limited thereto.

The stabilizer is selected from the group consisting of 2,6-di-tert-butyl-p-cresol, diethylethanolamine, trihexylamine, a hindered amine, an organic phosphate, a hindered phenol, and mixtures thereof. More specifically, the stabilizer is 2,6-di-tert-butyl-p-cresol.

To improve thermal and oxidation stability, storage stability, surface properties, flow properties and processing properties, conventional additives may be added, such as a leveling agent, a slip agent or a stabilizer.

The photocurable polymer composition for 3D printing includes the UV-curable polyurethane oligomer, and may include, based on 100 parts by weight of the UV-curable polyurethane oligomer, 1.5 to 15 parts by weight of the photoinitiator, 0.1 to 1.5 parts by weight of the silane coupling agent, 15 to 45 parts by weight of the oligomer, and 0.1 to 2 parts by weight of the stabilizer. When the silane coupling agent is used in an amount within the above-described range, it may improve compatibility with and adhesion to the resin when used for surface treatment of a pigment or a filler. If the oligomer is used in an amount exceeding the upper limit of the above-described range, it may reduce the mold release property of the resin by increasing surface energy and degrade the surface properties of the mold, such as post-stamping restoration force, by increasing surface hardness. When the stabilizer is used in an amount within the above-described range, it may reduce ambient cure and increase strength.

Advantageous Effects

The photocurable polymer composition for 3D printing according to the present disclosure can produce a 3D printed product having excellent physical properties such as thermal properties, strength, elastic modulus and tensile elongation.

In addition, the composition is a polymer composition for 3D printing, which can produce a 3D printed product which, even when the original shape thereof is deformed during use, can be restored to the original shape.

BEST MODE

The present disclosure is directed to a photocurable polymer composition for 3D printing including: a UV-curable polyurethane oligomer represented by the following Formula 1;
a photoinitiator; a silane coupling agent; an oligomer; and a stabilizer:

wherein
A is a substituent represented by Formula 2 above,
wherein * represents a moiety that is linked;
$R_1$ to $R_8$ are the same or different and are each independently a substituted or unsubstituted alkylene group having 1 to 200 carbon atoms, a substituted or unsubstituted arylene group having 6 to 200 carbon atoms, a substituted or unsubstituted heteroarylene group having 5 to 200 nuclear atoms, or a substituted or unsubstituted cycloalkylene group having 3 to 200 carbon atoms; and the substituted alkylene group, the substituted arylene group, the substituted heteroarylene group and the substituted cycloalkylene group are substituted with one or more substituents selected from the group consisting of hydrogen, deuterium, a cyano group, a nitro group, a halogen group, a hydroxyl group, an alkyl group having 1 to 30 carbon atoms, a cycloalkyl group having 1 to 20 carbon atoms, an alkenyl group having 2 to 30 carbon atoms, an alkynyl group having 2 to 24 carbon atoms, an aralkyl group having 7 to 30 carbon atoms, an aryl group having 6 to 30 carbon atoms, a heteroaryl group having 5 to 60 nuclear atoms, a heteroarylalkyl group having 6 to 30 carbon atoms, an alkoxy group having 1 to 30 carbon atoms, an alkylamino group having 1 to 30 carbon atoms, an arylamino group having 6 to 30 carbon atoms, an aralkylamino group having 6 to 30 carbon atoms, a heteroarylamino group having 2 to 24 carbon atoms, an alkylsilyl group having 1 to 30 carbon atoms, an arylsilyl group having 6 to 30 carbon atoms, and an aryloxy group having 6 to 30 carbon atoms, and when they are substituted with a plurality of sub stituents, these sub stituents are the same or different.

Mode for Invention

Hereinafter, embodiments of the present disclosure will be described in detail so that those skilled in the art to which the present disclosure pertains can easily carry out the present disclosure. However, the present disclosure may be embodied in a variety of different forms and is not limited to the embodiments described herein.

PREPARATION EXAMPLE

Preparation of Photocurable Polymer Composition for 3D Printing

A photocurable polymer composition for 3D printing was prepared by mixing a UV-curable polyurethane oligomer represented by the following Formula 3, a photoinitiator represented by the following Formula 5, 3-methacryloxypropyltrimethoxysilane, an epoxy acrylate oligomer, and 2,6-di-tert-butyl-p-cresol. The oligomer and the like, used in

[Formula 1]

[Formula 2]

the preparation of the polymer composition, were purchased, and the contents of the components are shown in Table 1 below.

wherein

A is a substituent represented by Formula 2 above, and n and m are the same or different and are each independently an integer ranging from 1 to 200.

TABLE 1

|  | S10 | S20 | S30 | S40 | S50 | S60 |
|---|---|---|---|---|---|---|
| UV-curable polyurethane oligomer | 100 | 100 | 100 | 100 | 100 | 100 |
| Photoinitiator | 1 | 1.5 | 5 | 10 | 15 | 20 |
| Silane coupling agent | 0.05 | 0.1 | 0.5 | 1 | 1.5 | 2 |
| Oligomer | 10 | 15 | 25 | 30 | 45 | 50 |
| stabilizer | 0.05 | 0.1 | 0.5 | 1 | 2 | 3 |

(unit: parts by weight)

TEST EXAMPLE

Test for Evaluation of Physical Properties

1. Test conditions
1-1. Tensile test
Test method: ASTM D638
Testing instrument: Universal Testing Machine
Test speed: 50 mm/min
Distance between grips: 115 mm
Load cell: 3000 N
Elasticity range: (0.05 to 0.25)%
Yield point: 0.2% offset
Test environment: $(23\pm2)°$ C. and $(50\pm5)\%$ R.H.
1-2. Flexural test
Test method: ASTM D790
Testing instrument: Universal Testing Machine
Test speed: 1.4 mm/min
Distance between spans: 55 mm
Load cell: 200 N
Elasticity range: (0.05 to 0.25)%
Test environment: $(23\pm2)°$ C. and $(50\pm5)\%$ R.H.
1-3. Izod impact strength
Test method: ASTM D256
Notch depth: 2.54 mm (machined by test client)
Test environment: $(23\pm2)°$ C. and $(50\pm5)\%$ R.H.
1-4. Compression test
Test method: ASTM D695
Test speed: 1.3 mm/min
Load cell: 30,000 N
Test environment: $(23\pm2)°$ C. and $(50\pm5)\%$ R.H.

Figure 1:
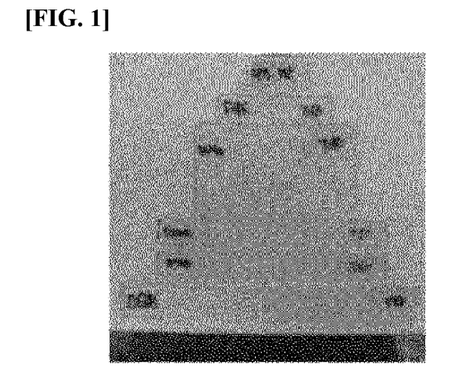
FIG. 1 is a photograph showing a 3D printed product produced using a polymer composition according to an embodiment of the present disclosure.
Figure 2:
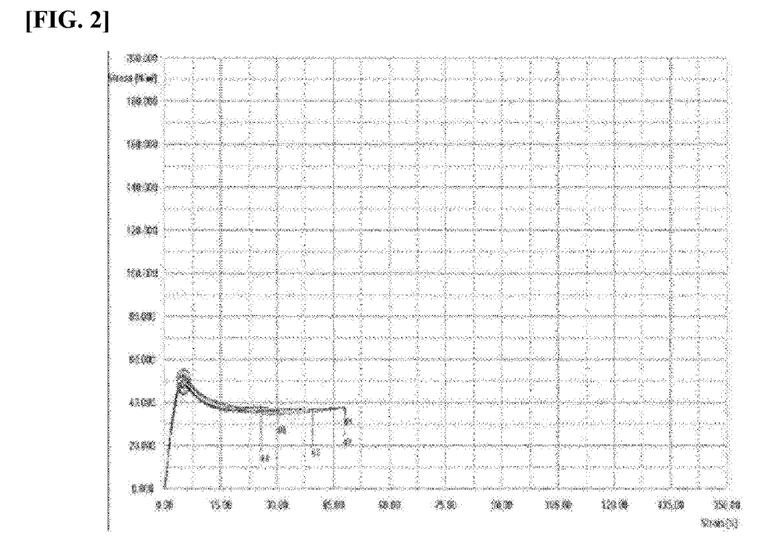
FIG. 2 is a graph showing the results of a tensile test for a 3D printed product according to an embodiment of the present disclosure.
Figure 3:
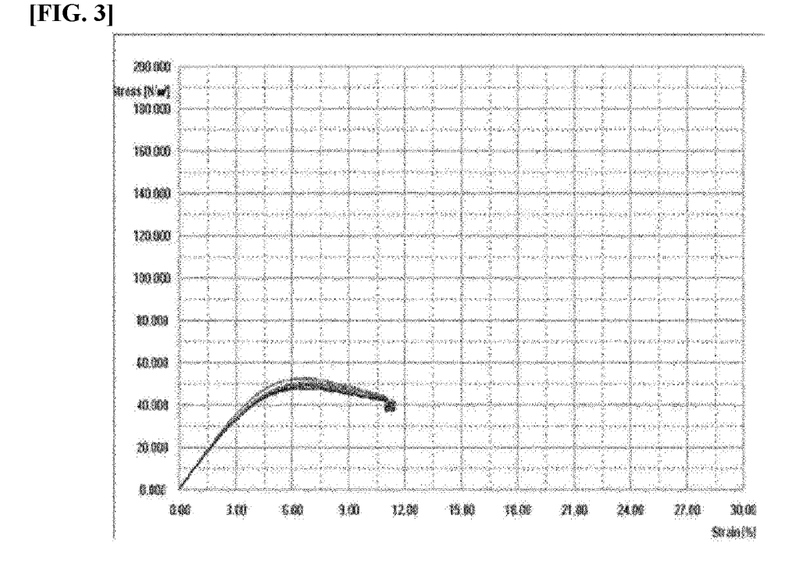
FIG. 3 is a graph showing the results of a flexural test for a 3D printed product according to an embodiment of the present disclosure.
Figure 4:
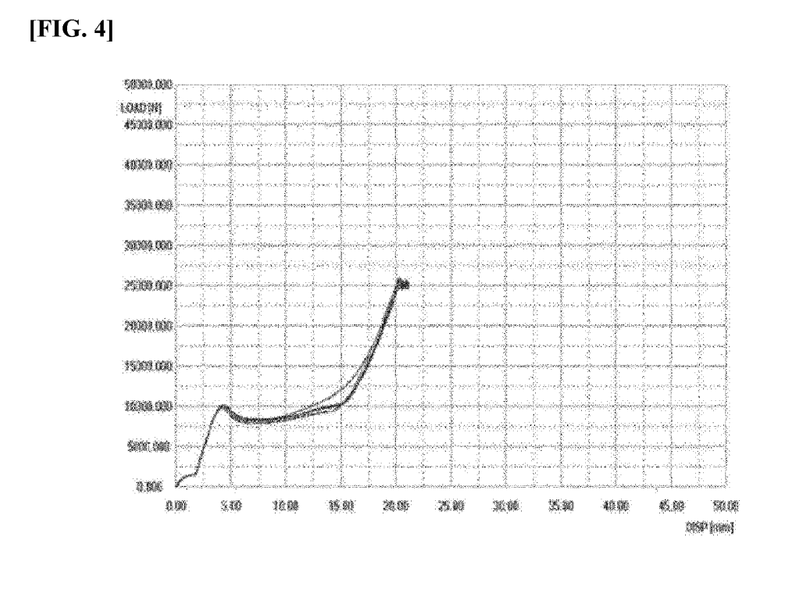
FIG. 4 is a graph showing the results of a compression test for a 3D printed product according to an embodiment of the present disclosure.

1-5. Durometer hardness
Test method: ASTM D2240
Test environment: $(23\pm2)°$ C. and $(50\pm5)\%$ R.H.
1-6. Heat deformation temperature
Test method: ASTM D648
Test load: 0.45 MPa
Heating rate: $2°$ C/min 2. Test results The above tests were conducted by the Korea Polymer Testing & Research Institute. The specimens provided were the specimens shown in FIG. 1, obtained from the polymer compositions of S10 to S50 in Table 1 above by printing using a 3D printer.

For comparative testing, specimens were prepared using a product of NextDent B.V., an ABS material and a PC material, respectively, and tested in comparison with S50. The results are shown in Table 2 below.

TABLE 2

|  | NextDent | ABS | PC | S50 |
|---|---|---|---|---|
| Viscosity (cps, 25° C.) | 1,020 | — | — | 492 |
| DOC (mm) IS040949 | 1.67 | — | — | 1.5 |
| DUROMETER HARDNESS(D) ASTM02240 | 87 | 77 | 83 | 93 |
| Flexural Strength ASTM D790-15 (MPa) | 99 | 63.7 | 85.3 | 137 |
| Flexural Modulus ASTM D790-15 (MPa) | 2,400 | 2,200 | 2,300 | 3,250 |
| Tensile Strength ASTM D638-15 (MPa) | — | 39.2 | 63 | 85.1 |
| Tensile Modulus ASTM D638-15 (MPa) | 1,780 | 2,160 | 2,770 | 3,800 |

As shown in Table 2 above, it was confirmed that, in comparison with the commercially available product, S50 showed lower viscosity, indicating easy handling, and exhibited better effects in the tensile test and the flexural test.

For S10 to S60, compressive strength, tensile strength, yield strength, flexural strength, flexural elasticity, elongation and heat deformation temperature were measured.

TABLE 3

| Specimen No. | Durometer hardness (D-type) | Compressive strength (MPa) | Tensile strength MPa) | Yield strength (MPa) | Elongation (%) | Tensile modulus (MPa) | Flexural strength (MPa) | Flexural modulus (MPa) | IZOD impact strength (KJ/m$^2$) | Heat deformation temperature (° C.) |
|---|---|---|---|---|---|---|---|---|---|---|
| S10 | 50 | 44.46 | 48.28 | 51.181 | 3.1 | 1154 | 55.54 | 48.3 | 1.42 | 32.1 |
| S20 | 83 | 74.55 | 49.38 | 49.38 | 7.56 | 1621 | 50.31 | 1206 | 2.52 | 52.5 |
| S30 | 88 | 75.65 | 52.99 | 33.71 | 7.24 | 2042 | 71.85 | 1612 | 4.74 | 57.6 |
| S40 | 84 | 73.45 | 70.10 | 45.24 | 7.62 | 1545 | 60.54 | 2950 | 5.34 | 80.5 |
| S50 | 89 | 77.75 | 85.13 | 33.46 | 7.14 | 2151 | 80.57 | 3215 | 5.12 | 72.1 |
| S60 | 65 | 50.45 | 48.22 |  | 4.21 | 1258 |  | 1835 | 2.23 | 80.6 |

As shown in Table 3 above which show the results of evaluating the physical properties of S10 to S60, it was confirmed that the maximum load, tensile strength, yield strength, gauge length, maximum displacement, elongation and elastic modulus of S10 and S60 were relatively low.

In addition, it was confirmed that S20 and S30 had a heat deformation temperature of about 52 to 58° C., indicating that when the printed products are deformed during use, they can be restored to the original shape thereof in water at a temperature of about 52 to 58° C. Also, it was confirmed that S20 and S30 exhibited excellent effects in terms of compressive strength, tensile strength, elastic modulus, and the like.

Furthermore, it was confirmed that S40 and S50 had a higher heat deformation temperature than S20 and S30, but exhibited better effects in terms of the other physical properties.

The difference in physical properties among S20, S30, S40 and S50 results from a difference in the contents of the components thereamong. Thus, it is possible to select and use a suitable polymer composition depending on the intended use of a printed product to be produced using a 3D printer.

Although the preferred embodiments of the present disclosure have been described above in detail, the scope of the present disclosure is not limited thereto. Various modifications and improvements, which are made by those skilled in the art without departing from the basic concept of the present disclosure as defined in the appended claims, also fall within the scope of the present disclosure.

INDUSTRIAL APPLICABILITY

The present disclosure relates to a photocurable polymer composition for 3D printering, and more particularly, to a photocurable polymer composition, which is applicable to 3D printing and can produce a 3D printed product, which has excellent physical properties such as thermal properties, strength, elastic modulus and tensile elongation and can be restored to the original shape thereof, by 3D printing the same.

The invention claimed is:

1. A photocurable polymer composition for 3D printing comprising:

a UV-curable polyurethane oligomer represented by the following Formula 3;

[Formula 3]

a photoinitiator represented by the following Formula 5;

[Formula 5]

a silane coupling agent;
an oligomer; and
a stabilizer,
wherein,
n and m are the same or different and are each independently an integer ranging from 1 to 200,
A is a substituent represented by the following Formula 2, wherein * represents a moiety that is linked;

[Formula 2]

R$_2$, R$_4$ to R$_6$ and R$_8$ are the same or different and are each independently a substituted or unsubstituted alkylene group having 1 to 200 carbon atoms, a substituted or unsubstituted arylene group having 6 to 200 carbon atoms, a substituted or unsubstituted heteroarylene group having 5 to 200 nuclear atoms, or a substituted or unsubstituted cycloalkylene group having 3 to 200 carbon atoms; and the substituted alkylene group, the substituted arylene group, the substituted heteroarylene group and the substituted cycloalkylene group are substituted with one or more substituents selected from the group consisting of hydrogen, deuterium, a cyano group, a nitro group, a halogen group, a hydroxyl group, an alkyl group having 1 to 30 carbon atoms, a cycloalkyl group having 1 to 20 carbon atoms, an alkenyl group having 2 to 30 carbon atoms, an alkynyl group having 2 to 24 carbon atoms, an aralkyl group having 7 to 30 carbon atoms, an aryl group having 6 to 30 carbon atoms, a heteroaryl group having 5 to 60 nuclear atoms, a heteroarylalkyl group having 6 to 30 carbon atoms, an alkoxy group having 1 to 30 carbon atoms, an alkylamino group having 1 to 30 carbon atoms, an arylamino group having 6 to 30 carbon atoms, an aralkylamino group having 6 to 30 carbon atoms, a heteroarylamino group having 2 to 24 carbon atoms, an alkylsilyl group having 1 to 30 carbon atoms, an arylsilyl group having 6 to 30 carbon atoms, and an aryloxy group having 6 to 30 carbon atoms, and when they are substituted with a plurality of sub stituents, these sub stituents are the same or different.

2. The photocurable polymer composition of claim 1, wherein the UV-curable polyurethane oligomer has a weight-average molecular weight of 10,000 to 1,000,000.

3. The photocurable polymer composition of claim 1, wherein the oligomer is selected from the group consisting of an epoxy acrylate oligomer, $H_{12}$ Dian-bis-glycidyl ether (4,4'-(1-methylethylidene)biscyclohexanol polymer with (chloromethyl)oxirane), and a mixture thereof.

4. The photocurable polymer composition of claim 1, wherein the stabilizer is selected from the group consisting of 2,6-di-tert-butyl-p-cresol, diethylethanolamine, trihexylamine, a hindered amine, an organic phosphate, a hindered phenol, and mixtures thereof.

5. The photocurable polymer composition of claim 1, wherein the polymer composition comprises the UV-curable polyurethane oligomer and comprises, based on 100 parts by weight of the UV-curable polyurethane oligomer, 1.5 to 15 parts by weight of the photoinitiator, 0.1 to 1.5 parts by weight of the silane coupling agent, 15 to 45 parts by weight of the oligomer, and 0.1 to 2 parts by weight of the stabilizer.

* * * * *